US012664465B2

(12) United States Patent
Puente Pestaña

(10) Patent No.: US 12,664,465 B2
(45) Date of Patent: Jun. 23, 2026

(54) METHODS, APPARATUS AND MACHINE-READABLE MEDIA RELATING TO DATA ANALYTICS IN A COMMUNICATIONS NETWORK

(71) Applicant: Telefonaktiebolaget LM Ericsson (publ), Stockholm (SE)

(72) Inventor: Miguel Angel Puente Pestaña, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 871 days.

(21) Appl. No.: 17/919,884

(22) PCT Filed: Jul. 10, 2020

(86) PCT No.: PCT/EP2020/069625
§ 371 (c)(1),
(2) Date: Oct. 19, 2022

(87) PCT Pub. No.: WO2021/213688
PCT Pub. Date: Oct. 28, 2021

(65) Prior Publication Data
US 2023/0153685 A1      May 18, 2023

(30) Foreign Application Priority Data
Apr. 21, 2020    (EP) ..................................... 20382325

(51) Int. Cl.
*G06N 20/00*          (2019.01)
*H04L 41/16*          (2022.01)
(52) U.S. Cl.
CPC ............. *G06N 20/00* (2019.01); *H04L 41/16* (2013.01)
(58) Field of Classification Search
CPC .......... G06N 20/00; H04L 41/16; H04L 41/00
(Continued)

(56) References Cited

U.S. PATENT DOCUMENTS 8,843,427 B1 * 9/2014 Lin ........................ G06N 20/00
                                                                705/16
2014/0180982 A1 * 6/2014 Murphy ................. G06N 5/022
                                                                706/14
(Continued)

FOREIGN PATENT DOCUMENTS

EP          3101599 A2    12/2016
WO    WO-2019119435 A1 *  6/2019   ........... H04W 24/04
WO        2020070118 A1    4/2020

OTHER PUBLICATIONS

3GPP, "3rd Generation Partnership Project; Technical Specification Group Services and System Aspects; Architecture enhancements for 5G System (5GS) to support network data analytics services (Release 16)", TS 23.288 V0.3.0, Mar. 2019, pp. 1-44. (Year: 2019).*
(Continued)

*Primary Examiner* — Hwei-Min Lu
(74) *Attorney, Agent, or Firm* — Sage Patent Group

(57) ABSTRACT

There is provided a method performed by a first data analytics entity for a communications network. The first data analytics entity has access to a first dataset of network data. The method comprises: receiving a request message from a second data analytics entity for the communications network, the request message comprising a model generated by the second data analytics entity using a machine-learning algorithm based on a second dataset to which the second data analytics entity has access, and an indication of an analytic to be calculated by the model; applying the model to the first dataset to measure the accuracy of the model; and transmitting a response message to the second data analytics entity comprising an indication of the accuracy of the model when applied to the first dataset.

17 Claims, 16 Drawing Sheets

(58) Field of Classification Search
USPC .......................................................... 706/12
See application file for complete search history.

(56) References Cited

U.S. PATENT DOCUMENTS

| | | | | |
|---|---|---|---|---|
| 2016/0358099 | A1* | 12/2016 | Sturlaugson | ........... G06N 5/043 |
| 2018/0060759 | A1* | 3/2018 | Chu | ........................ G06N 20/00 |
| 2019/0095785 | A1* | 3/2019 | Sarkar | .................. G06N 3/0985 |
| 2019/0114293 | A1* | 4/2019 | Li | ........................ G06F 16/2465 |
| 2019/0156247 | A1* | 5/2019 | Faulhaber, Jr. | .......... G06N 3/08 |
| 2019/0258947 | A1* | 8/2019 | Doddi | .................... G06N 5/041 |
| 2019/0259041 | A1* | 8/2019 | Jackson | ................ G06F 16/288 |
| 2019/0332603 | A1* | 10/2019 | Fly | .................... G06F 16/24578 |
| 2019/0394655 | A1* | 12/2019 | Rahman | ................ H04L 41/142 |
| 2020/0065342 | A1* | 2/2020 | Panuganty | .............. G06F 16/26 |
| 2022/0329493 | A1* | 10/2022 | Hong | ...................... H04L 41/16 |
| 2022/0408280 | A1* | 12/2022 | Li | .......................... H04W 24/02 |
| 2023/0146099 | A1* | 5/2023 | Ouyang | .................. H04L 41/16 |
| | | | | 709/223 |

OTHER PUBLICATIONS

Niknam et al., "Federated Learning for Wireless Communications: Motivation, Opportunities and Challenges", ARXIV ID: 1908. 06847, Jul. 30, 2019, pp. 1-6. (Year: 2019).*

ZTE, "Discussion on NWDAF functions split", S2-1911138, 3GPP TSG-SA2 Meeting #136, Reno, Nevada, United States, Nov. 19-22, 2019, pp. 1-2. (Year: 2019).*

Isaksson et al., " Secure Federated Learning in 5G Mobile Networks", ARXIV ID: 2004.06700, Apr. 14, 2020, pp. 1-7. (Year: 2020).*

International Search Report and Written Opinion of the International Searching Authority for PCT International Application No. PCT/EP2020/069625 dated Mar. 23, 2021.

ZTE, "Discussion on NWDAF functions split," S2-1911138, 3GPP TSG-SA2 Meeting #136, Reno, Nevada, United States, Nov. 18, 2019-Nov. 22, 2019, 2 pages.

ZTE, "Discussion on the usage of AI model," S2-1908945, SA WG2 Meeting #135, Oct. 14-18, 2019, Split, Croatia, 3 pages.

3GPP TS 23.288 V16.3.0, "3rd Generation Partnership Project; Technical Specification Group Services and System Aspects; Architecture enhancements for 5G System (5GS) to support network data analytics services (Release 16)," Mar. 2020, 62 pages.

3GPP TR 23.700-91 V0.3.0, "3rd Generation Partnership Project; Technical Specification Group Services and System Aspects; Study on enablers for network automation for the 5G System (5GS); Phase 2 (Release 17)," Jan. 2020, 35 pages.

Huawei et al., "Solution to multiple NWDAF instances," S2-2001210, SA WG2 Meeting #136AH, Jan. 13-17, 2020, Incheon, Korea, 7 pages.

Huawei et al., "Solution to multiple NWDAF instances," S2-2000854, SA WG2 Meeting #136AH, Jan. 13-17, 2020, Incheon, Korea, 4 pages.

3GPP TS 23.288 V16.5.0, "3rd Generation Partnership Project; Technical Specification Group Services and System Aspects; Architecture enhancements for 5G System (5GS) to support network data analytics services (Release 16)," Sep. 2020, 66 pages.

* cited by examiner

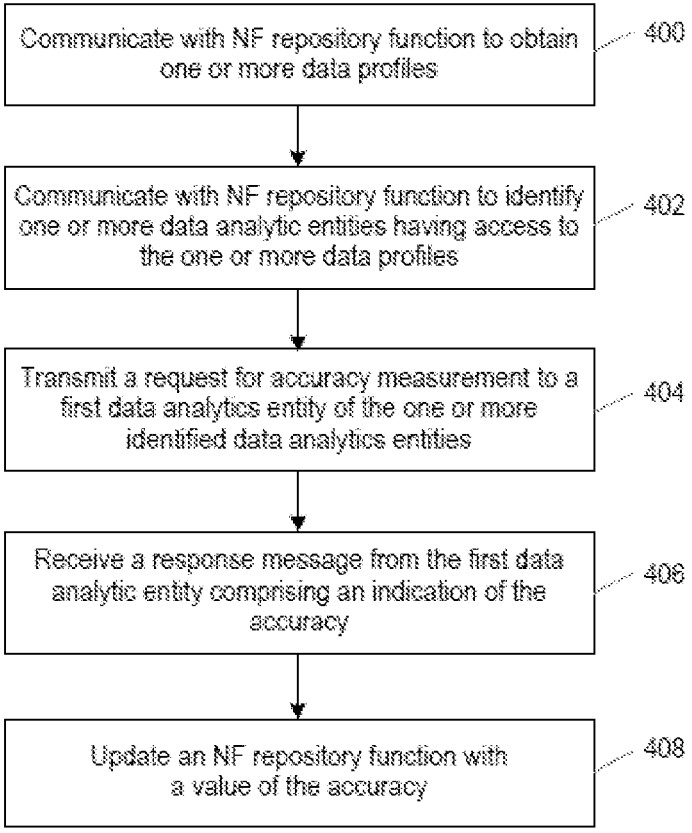

Communicate with NF repository function to obtain one or more data profiles — 400

Communicate with NF repository function to identify one or more data analytic entities having access to the one or more data profiles — 402

Transmit a request for accuracy measurement to a first data analytics entity of the one or more identified data analytics entities — 404

Receive a response message from the first data analytic entity comprising an indication of the accuracy — 406

Update an NF repository function with a value of the accuracy — 408

Fig. 4

600. Nnrf_NFRegister (Data profile, list (Analytic-ID, algorithm-type, accuracy), Accuracy Measurement service support)

602. Response

700. Nnrf_NFUpdate (NWDAF-ID, Data profile)

702. Response

812. Response (list (NWDAF address, (opt) algorithm-type))

814. Nnwdaf_AccuracyMeasurement (Analytic-ID, model, algorithm-type))

816. Response (Accuracy)

818. Nnrf_NFUpdate (NWDAF-ID, Analytic-ID, accuracy)

820. Nnrf_NFUpdate (NWDAF-ID, Analytic-ID, accuracy)

1500

1504 — Memory

1502 — Processing circuitry

1506 — Interface(s)

1600

1602

Receiving Unit

METHODS, APPARATUS AND MACHINE-READABLE MEDIA RELATING TO DATA ANALYTICS IN A COMMUNICATIONS NETWORK

CROSS REFERENCE TO RELATED APPLICATIONS

This application is a 35 U.S.C. § 371 national stage application of PCT International Application No. PCT/EP2020/069625 filed on Jul. 10, 2020, which claims the benefit of European Patent Application No. 20382325.7, filed on Apr. 21, 2020, the disclosures and content of which are incorporated by reference herein in their entireties.

TECHNICAL FIELD

Embodiments of the disclosure relate to communications networks, and particularly to methods, apparatus and machine-readable media relating to data analytics in a communications network.

BACKGROUND

Wireless communications networks typically comprise a radio access network, which provides the radio interface allowing wireless user devices (such as user equipments, UEs) to access the network, and a core network which enables the radio access networks to transmit data to external networks such as the internet. The core network may also provide a number of other functions, including mobility management, session management, transport for data packets, charging services, etc.

Core networks have evolved with the evolving mobile communication standards. For example, the General Packet Radio Services (GPRS) core network formed part of 2G, 3G and wideband code-division multiple access (WCDMA) mobile networks. For Long Term Evolution (LTE), the Evolved Packet Core (EPC) was developed. For the fifth generation of mobile networks, known as 5G, 3GPP has developed the so-called 5G core network (5GC). The 5GC has what is referred to as a service-based architecture, meaning that interactions between different network entities (typically implemented virtually and referred to as "functions") are typically implemented in terms of a registration and subscription model. Network entities register themselves with the core network (and particularly register the services that they can provide), and then receive requests for that service or subscriptions to that service from other network entities. Similarly, a network entity which is registered with the core network can itself request services of other network entities. For example, a first network entity may subscribe to receive event notifications from one or more second network entities.

The 3GPP standards define a large number of different network entities, as well as the rules governing interactions with those entities. One such network entity is the Network Data Analytics Function (NWDAF), which is tasked with collating information on the performance of the network and providing analytics on that data. The NWDAF interacts with different entities for different purposes, as follows:

Data collection based on event subscription;
Retrieval of information from data repositories;
Retrieval of information about Network Functions (NFs); and
On-demand provision of analytics to consumers.

A single instance or multiple instances of NWDAFs may be deployed in a network (e.g., a public land mobile network, PLMN). If multiple NWDAF instances are deployed, the architecture supports deploying the NWDAF as a central NF, as a collection of distributed NFs, or as a combination of both. When multiple NWDAFs exist, not all of them may provide the same type of analytics results. For example, some NWDAFs may specialize in providing certain types of analytics, while others provide different types of analytics. An Analytics ID information element is used to identify the type of analytics that the NWDAF can generate.

Some of the types of analytic provided by the NWDAF are expected to be generated based on one or more machine learning models. FIG. 1 is a schematic diagram showing this process in an example NWDAF 100. The NWDAF 100 comprises a data collection module 102, which collects data from one or more network functions 110 of the network (and/or other data sources). The collected data is passed to one or more training modules 104, which utilize machine-learning algorithms to generate and train respective models 106. The models 106 may be classifier models or, as in the illustration, prediction models. In particular, FIG. 1 shows a further network function 120 providing input data to one of the models 106, and receiving one or more predictions from the NWDAF 100 based on the input data.

Each trained model 106 has certain characteristics or metadata, such as model accuracy, error statistics, ratio of false positives, training time, characteristics of the data set used for training, etc.

SUMMARY

As noted above, 3GPP specifies that different NWDAF instances can coexist in a network. For example, the different NWDAF instances may provide different analytics, or different sets of analytics, having access to different sets of data, executing different algorithms, etc.

FIG. 2 is a schematic diagram showing one possible network architecture 200. The architecture comprises four NWDAFs, labelled NWDAF A, NWDAF B, NWDAF C and NWDAF D. Each of the NWDAFs generates the same data analytic using a model developed using machine-learning; however, the NWDAFs differ in the machine-learning algorithms used to develop the model, and in the data sets the model was trained on.

NWDAFs A and B have access to a first data set, Data set 1; NWDAFs C and D have access to a second, different data set, Data set 2. For example, Data sets 1 and 2 may be physically separated data sets (e.g., Data Set 1 may be the data storage infrastructure in an edge deployment, while Data Set 2 may be a central data storage infrastructure in a macro data-center), or logically separated data sets (e.g., data sets collected at different times, and potentially stored in separate logical data storage units.

NWDAFs A and C developed their models using a first machine-learning algorithm, Algorithm 1 (e.g., random forest); NWDAFs B and D developed their models using a second, different machine-learning algorithm, Algorithm 2 (e.g., a neural network).

A consumer of the services provided by the NWDAFs in the architecture 200, seeking to obtain values for the data analytic provided by each of the NWDAFs, may experience several technical problems.

For example, as noted above, the models generated in each NWDAF are trained using different data sets and/or different machine learning algorithms. The accuracy of the models depends on the quantity and quality of the data collected and stored in each Data Set. Thus the accuracy of the models may vary between NWDAFs A and B, as compared to NWDAFs C and D. Different machine-learning algorithms may also entail different model accuracies. Thus the accuracy of the models may vary between NWDAFs A and C, as compared to NWDAFs B and D.

The problem of varying accuracy may be compounded by the fact that each NWDAF instance measures its model accuracy using a subset of the data which is available to it. One model may perform very well (with high accuracy) on a first set of the data, but poorly (with low accuracy) on a different set of data. Therefore, a NWDAF instance may report that a certain model's accuracy is high based on its performance over a limited set of data which is available to that NWDAF instance. However, that reported accuracy may itself be inaccurate (e.g., the model may be less accurate than reported). In turn, consumers may select NWDAFs based on their reported analytics accuracy, and this can lead to the erroneous selection of NWDAFs with inaccurate algorithms.

Embodiments of the disclosure seek to address these and other problems.

In a first aspect, there is provided a method performed by a first data analytics entity for a communications network. The first data analytics entity has access to a first dataset of network data. The method comprises: receiving a request message from a second data analytics entity for the communications network, the request message comprising a model generated by the second data analytics entity using a machine-learning algorithm based on a second dataset to which the second data analytics entity has access, and an indication of an analytic to be calculated by the model; applying the model to the first dataset to measure the accuracy of the model; and transmitting a response message to the second data analytics entity comprising an indication of the accuracy of the model when applied to the first dataset.

In a second aspect, there is provided a method performed by a second data analytics entity for a communications network. The second data analytics entity has access to a second dataset of network data. The method comprises: transmitting a request message to a first data analytics entity for the communications network, the request message comprising a model generated by the second data analytics entity using a machine-learning algorithm based on the second dataset, and an indication of an analytic to be calculated by the model, the first data analytics entity having access to a first dataset of network data; and receiving a response message from the first data analytics entity comprising an indication of the accuracy of the model when applied to the first dataset to calculate one or more values for the analytic.

In a third aspect, there is provided a method performed by a network function repository entity for a communications network. The method comprises: receiving a registration request message from a first data analytics entity, the first data analytics entity having access to a first dataset of network data, the registration request message comprising: a data profile for the first dataset; an indication of analytics which the first data analytics entity is capable of calculating; and an indication that the first data analytics entity is capable of responding to request messages from other data analytics entities.

Apparatus and machine-readable mediums are also provided for performing the methods set out above. For example, one apparatus provides a first data analytics entity for a communications network. The first data analytics entity has access to a first dataset of network data and comprises processing circuitry and a non-transitory machine-readable medium storing instructions which, when executed by the processing circuitry, cause the first data analytics entity to: receive a request message from a second data analytics entity for the communications network, the request message comprising a model generated by the second data analytics entity using a machine-learning algorithm based on a second dataset to which the second data analytics entity has access, and an indication of an analytic to be calculated by the model; apply the model to the first dataset to measure the accuracy of the model; and transmit a response message to the second data analytics entity comprising an indication of the accuracy of the model when applied to the first dataset.

Another apparatus provides a second data analytics entity for a communications network. The second data analytics entity has access to a second dataset of network data and comprises processing circuitry and a non-transitory machine-readable medium storing instructions which, when executed by the processing circuitry, cause the second data analytics entity to: transmit a request message to a first data analytics entity for the communications network, the request message comprising a model generated by the second data analytics entity using a machine-learning algorithm based on the second dataset, and an indication of an analytic to be calculated by the model, the first data analytics entity having access to a first dataset of network data; and receive a response message from the first data analytics entity comprising an indication of the accuracy of the model when applied to the first dataset to calculate one or more values for the analytic.

A further apparatus provides a network function repository entity for a communications network. The network function repository entity comprises processing circuitry and a non-transitory machine-readable medium storing instructions which, when executed by the processing circuitry, cause the network function repository entity to: receive a registration request message from a first data analytics entity, the first data analytics entity having access to a first dataset of network data, the registration request message comprising: a data profile for the first dataset; an indication of analytics which the first data analytics entity is capable of calculating; and an indication that the first data analytics entity is capable of responding to request messages from other data analytics entities.

BRIEF DESCRIPTION OF THE DRAWINGS

FIG. 4 is a flowchart of a method performed by a data analytics entity according to further embodiments of the disclosure;

DETAILED DESCRIPTION

Embodiments of the disclosure provides methods, apparatus and computer-readable media which enable data analytics entities such as network data analytics functions (NWDAFs) to check the accuracy of their models on different datasets. An accuracy measurement service is provided by one or more first data analytics entities, by which second data analytics entities check the accuracy of their models. Support of the accuracy measurement service may be discoverable through interactions with a network function repository entity, such as a network function repository function (NRF).

In further embodiments, the dataset which is accessible by each data analytics function is itself registered with a network function repository entity such as a NRF. A profile for the dataset, comprising data such as the size of the dataset and/or statistical information related to the parameters of the dataset, may be registered with the network function repository entity such that the datasets themselves can be discovered by data analytics entities seeking to test the accuracy of their models.

Figure 1:
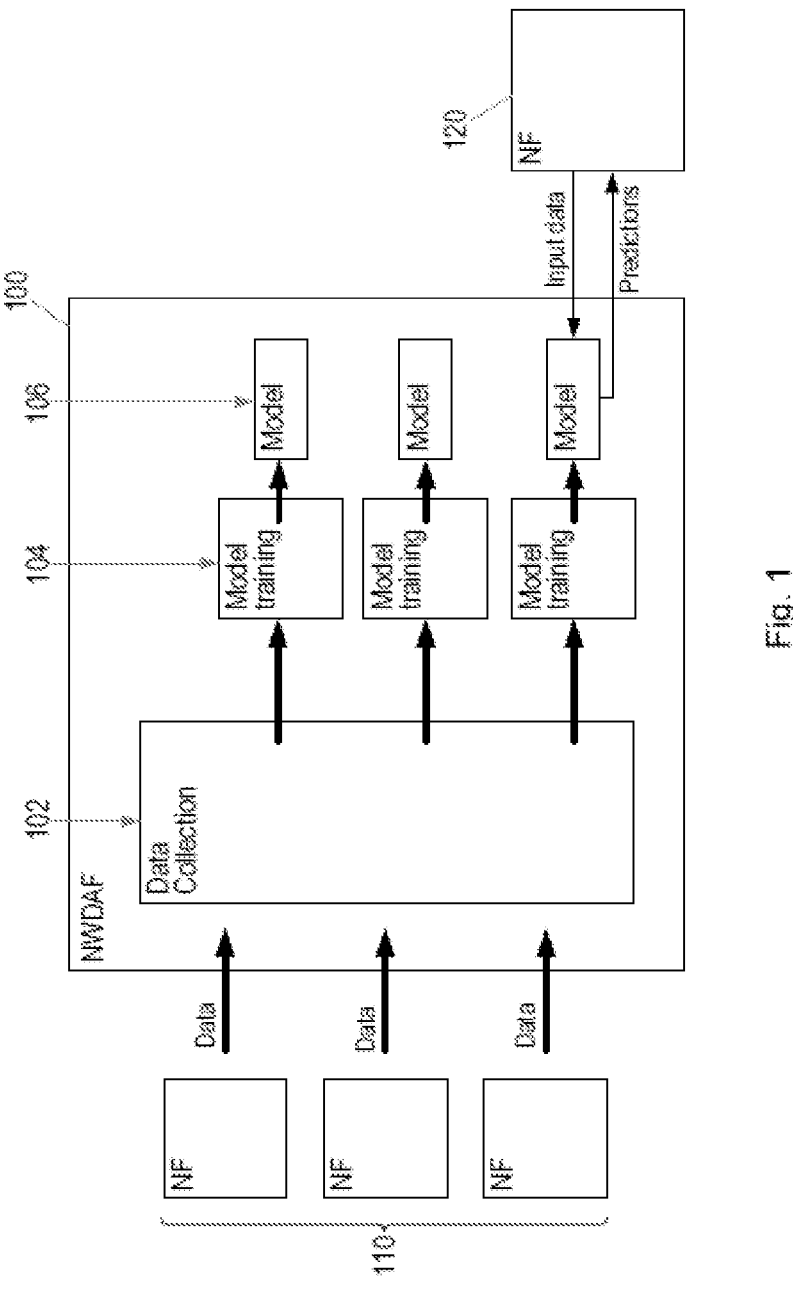
FIG. 1 shows an example of an NWDAF.
Figure 2:
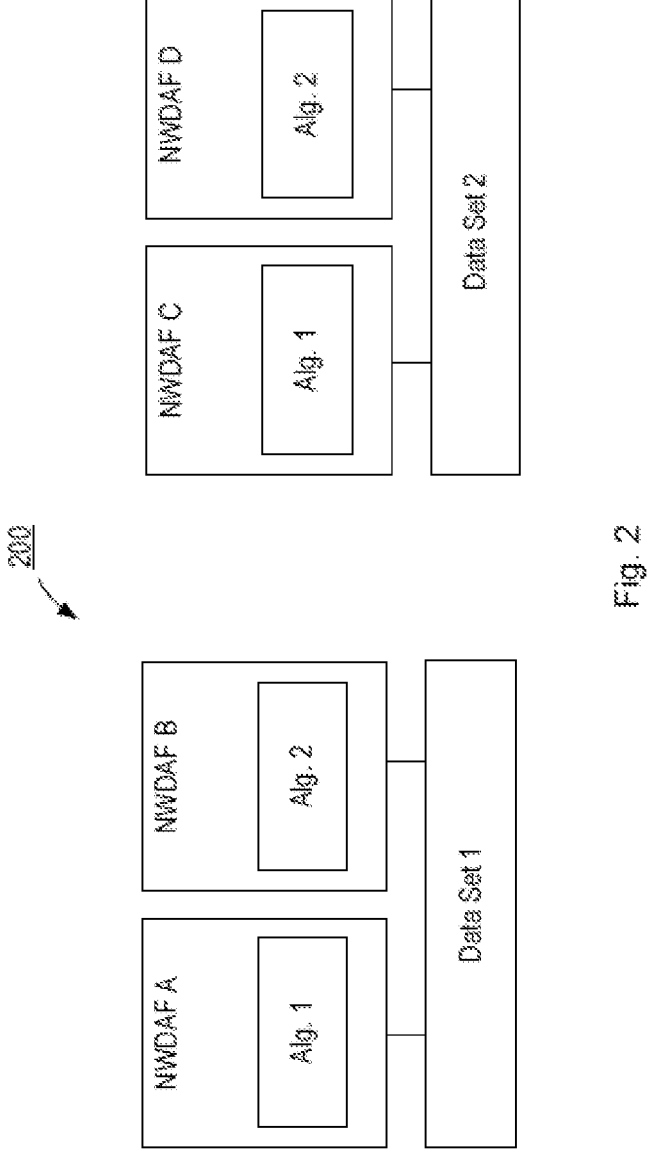
FIG. 2 shows an example of a network architecture.
Figure 3:
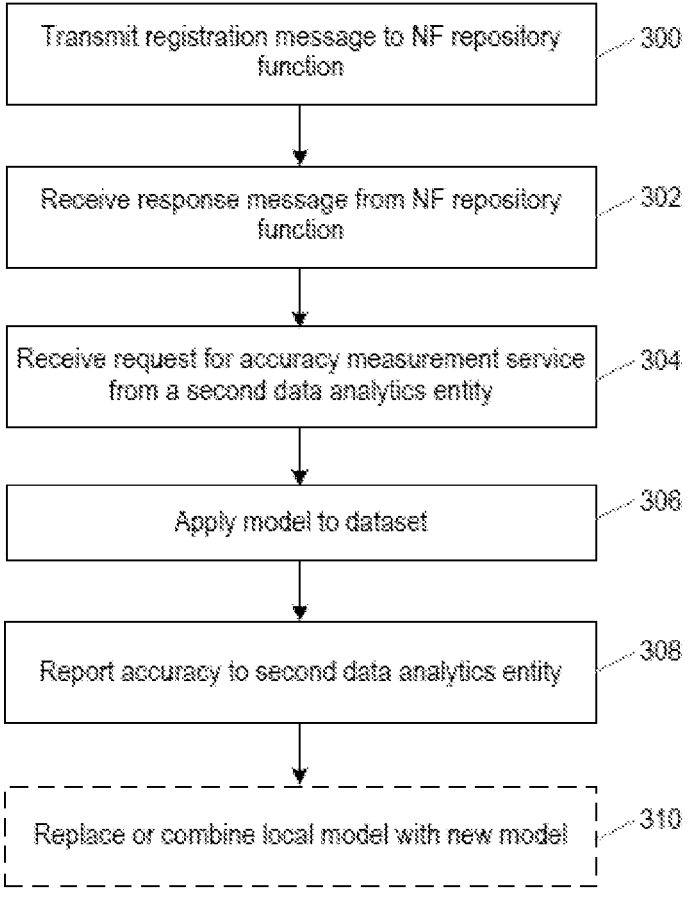
FIG. 3 is a flowchart of a method performed by a data analytics entity according to embodiments of the disclosure.

FIG. 3 is a flowchart of a method according to embodiments of the disclosure. The method may be performed by a data analytics entity for a communications network (such as a network function or a network node). In one embodiment, the data analytics entity implements the functionality of a NWDAF. The data analytics entity performing the method of FIG. 3 may at times be referred to as a first data analytics entity, in order to distinguish it from other data analytics entities.

A number of the steps of FIG. 3 are illustrated in the signalling diagrams of FIGS. 6 to 9. In particular, the steps of FIG. 3 may correspond in some embodiments to the signalling and actions of the NWDAF shown in FIGS. 6 and 7, and NWDAF B shown in FIGS. 8*a*/8*b* and 9*a*/9*b*.

As noted above, the data analytics entity collects network data from one or more network functions of the network. For example, the network data may comprise data relating to user traffic flowing over the network. The data may comprise an indication of an amount of user traffic flowing over different nodes (e.g., radio access nodes), a pattern of the user traffic (e.g., how the amount of traffic varies over time), a type of user traffic (e.g., what quality of service the traffic is associated with, a destination of the user traffic), etc. In a further example, the network data may comprise data relating to performance of the network. The data may comprise an indication of a capacity or bandwidth of different nodes or links in the network, a load of those nodes or links and how that load varies over time, a latency of traffic transmitted over the nodes or links, etc.

The data analytics entity may collect network data from those network functions which are accessible to it. For example, the network functions may belong to a particular network operator or a particular public land mobile network (PLMN) in which the data analytics entity. In one embodiment, the network functions may be located or implemented in a particular country or other geographic area.

The network data collected by the data analytics entity is referred to herein as a dataset of network data. It will be appreciated that the dataset collected by the data analytics entity may in general be different from datasets collected and used by other data analytics entities, for example through being collected from different network entities or functions (e.g., in different networks or countries).

The method begins in step 300, in which the data analytics entity transmits a registration message to a network function repository function (NRF), registering the services provided by the data analytics entity. The signalling in this step is shown in greater detail in FIG. 6.

Thus in step 600 the data analytics entity (NWDAF) transmits an NF registration message to the network function repository function (NRF). Alternatively worded according to the service-based architecture of the 5GC, the data analytics entity invokes the NF registration service (Nnrf_NFRegister) in the NRF.

The registration message may comprise an indication of, or a profile of, the dataset which is available to the data analytics entity, and on which the models developed by the data analytics entity are trained. The indication of the dataset may comprise one or more of: an identifier for the dataset; the number of samples in the dataset; and information on the parameters of the dataset. The information on the parameters of the dataset may comprise an indication of which parameters are included in the dataset (e.g., one or more identifiers for the parameters) as well as statistical information for the parameters, e.g., average values (mean, median, etc), maximum and/or minimum values, percentiles, variance, proportion of null or void values, etc. The indication of the dataset may further comprise time information for the dataset, e.g., an indication of the time window in which the data was collected, an average time for the data, variance of the time, whether or not the data samples include timestamps, etc.

The registration message may further comprise an indication of the analytics which the data analytics entity is capable of providing. For each analytic, the indication may comprise one or more of: an identifier for the analytic; the type of machine-learning algorithm used to train the model providing the analytic; and an accuracy of the model providing the analytic.

According to embodiments of the disclosure, the registration message further comprises an indication of whether or not the data analytics entity supports an accuracy measurement service. According to this service, a data analytics entity (e.g., a first data analytics entity) can receive requests from other data analytics entities (e.g., second data analytics entities) to test the accuracy of a model generated by the second data analytics entities against the dataset available to the first data analytics entity. This aspect is described in further detail below. For the purposes of description of the embodiments of the disclosure, it is assumed that the data analytics entity does support the accuracy measurement service.

In step 602 (and also in step 302), the NRF acknowledges the registration of the service provided by the data analytics entity by transmitting an acknowledgement message to the data analytics entity.

Returning to FIG. 3, and in step 304 the data analytics entity receives a request message from a second data analytics entity invoking the accuracy measurement service. This step may correspond to step 814 or step 914 described below.

The request message comprises a request for the data analytics entity to measure the accuracy of a model, developed by the second data analytics entity, against the dataset which is available to the first data analytics entity. As noted above, one problem with the development of models through machine-learning algorithms is that the accuracy of the model depends on the dataset used to train the model. According to embodiments of the disclosure, the accuracy of models can be tested by providing the model to other data analytics entities having access to different datasets.

The request message may include one or more of: an identifier for the analytic obtained by the model; the model itself, e.g., parameters, coefficients, etc; an indication of the type of machine-learning algorithm used to develop the model; and metadata of the model (e.g., a list of input parameters, layers and neurons per layer if the model is a neural network, etc). Those skilled in the art will appreciate that in alternative embodiments the model itself may be communicated to the data analytics entity in a different way, e.g., by providing a network address from which the model can be obtained.

In step 306 the data analytics entity applies the model to its own dataset (e.g., either the whole dataset or a subset thereof) and measures the accuracy of the model. For example, where the model is a classifier, the model can be applied to data for which the classification is known.

In step 308 (which may correspond to step 816, for example), the data analytics entity reports the accuracy of the model to the second data analytics entity. The report message may comprise an indication of the identity of the model or some other identifier for the current invocation of the accuracy measurement service, and an indication of accuracy of the model when applied to the dataset of the first data analytics entity. The second data analytics entity is then enabled to update the accuracy of its model, for example, through communication with the network function reposi-tory function (NRF).

Optionally, in step 310 the first data analytics entity may choose to replace its own model for the particular analytic being tested with the model developed by the second data analytics entity. For example, if the model developed by the second data analytics entity has a higher accuracy than the model of the first data analytics entity, or an accuracy which is higher by some threshold amount, the first data analytics entity may choose to use the tested model instead of its own. Alternatively, if the model architecture permits it, the mod-els may be combined to provide a new model with even higher accuracy. The first data analytics entity may use the tested model in any appropriate way to improve the accuracy of its own model.

FIG. 4 is a flowchart of a method according to embodi-ments of the disclosure. The method may be performed by a data analytics entity for a communications entity (such as a network function or a network node). In one embodiment, the data analytics entity implements the functionality of a network data analytics function (NWDAF).

As noted above, the data analytics entity collects a dataset of network data from one or more network functions of the network, and develops models using machine-learning algo-rithms to determine one or more analytics based on that dataset. FIG. 4 is a flowchart of a method in which a data analytics entity seeks to test the accuracy of a model that it has developed against a different dataset. The description of FIG. 4 may thus be read in conjunction with FIG. 3, with certain steps in FIG. 4 providing the counterpart actions of the second data analytics entity described above.

A number of the steps of FIG. 4 are illustrated in the signalling diagrams of FIGS. 6 to 9. In particular, the steps of FIG. 4 may correspond in some embodiments to the signalling and actions of the NWDAF shown in FIGS. 6 and 7, and NWDAF A shown in FIGS. 8*a*/8*b* and 9*a*/9*b*.

The method begins in step 400, in which the second data analytics entity communicates with a network function repository entity (NRF) to obtain the profiles of one or more datasets with which to determine the accuracy of the model.

For example, it may be disadvantageous to measure the accuracy of the model against a dataset which is too small, or out of date. The accuracy measurement itself may be inaccurate, or irrelevant when the model is applied to current network data. Thus the second data analytics entity may provide one or more criteria to the NRF with which to filter the set of data profiles registered with it. For example, the criteria may comprise one or more conditions with respect to the size of the dataset (e.g., a minimum number of data samples) and/or with respect to a relevant parameter. In the latter case, where the relevant parameter is time, for example, the criterion may be that the average time of the data is no older than a particular time threshold; where the relevant parameter is some other data parameter to be classified, for example, the criterion may be that the variance is greater than a particular threshold to provide for different classifications. Different criteria may be used for different analytics.

In one embodiment, the communication with the NRF is by way of invoking a service in the NRF, i.e., by transmitting a request message to the NRF comprising an indication of the filter criteria, and receiving a response message from the NRF comprising an indication of the datasets which meet the criteria. This embodiment is shown below in steps 800 and 802, and in steps 900 and 902. This subscription-based embodiment is shown in steps 804, 806 and 808, and in steps 904, 906 and 908. Alternatively, the communication with the NRF may be by way of subscription to receive notifications of events from the NRF. According to this embodiment, the second data analytics entity transmits a request message to the NRF comprising an indication of the filter criteria as above. In this case, however, the request message is for subscription to receive notifications when a data profile meeting the filter criteria is registered with the NRF. The NRF then continuously checks for datasets meeting the criteria and notifies the second data analytics entity once that occurs.

In either case, the second data analytics thus receives one or more messages from the NRF comprising an indication of one or more data profiles meeting the criteria. The messages may comprise the same data as indicated in the registration message described above with respect to step 300, i.e., one or more of: an identifier for the dataset; the number of samples in the dataset; and information on the parameters of the dataset.

From these data profiles, the second data analytics entity selects a dataset with which to test the accuracy of its model. The selection may be random, or follow a particular meth-odology. For example, the largest dataset may be selected, or the dataset with the most (or least) variance of a particular parameter. The methodology which is followed (if any) may vary according to the analytic obtained by the model.

In step 402 (which may correspond to steps 810 and 812, or 910 and 912), the second data analytic entity communi-cates with the NRF to obtain the identities of one or more first data analytic entities having access to the selected dataset. The second data analytic entity thus transmits a discovery request message to the NRF comprising an indi-cation of one or more of: the network function type to be discovered (e.g., NWDAF); an identifier for the analytic determined by the model; an identifier for the selected dataset; an indication that the target first data analytic entity supports the accuracy measurement service; and, optionally, an indication of the machine-learning algorithm used to develop the model. The NRF responds with a discovery response message comprising an indication of one or more first data analytic entities which are registered with it and which meet the criteria in the discovery request message. For example, the discovery response message may comprise network addresses for each of the first data analytic entities. If the machine-learning algorithm type was not included in the discovery request message, the discovery response message may additionally include an indication of the machine-learning algorithm supported by the first data analytic entities.

In step 404, the second data analytic entity selects a first data analytics entity from those identified in step 402 (the selection may be random, for example), and transmits a request message to the first data analytics entity invoking the accuracy measurement service. This step may correspond to step 814 or step 914 described below.

The request message comprises a request for the first data analytics entity to measure the accuracy of the model developed by the second data analytics entity, against the dataset which is available to the first data analytics entity. As noted above, one problem with the development of models through machine-learning algorithms is that the accuracy of the model depends on the dataset used to train the model. According to embodiments of the disclosure, the accuracy of models can be tested by providing the model to other data analytics entities having access to different datasets.

The request message may include one or more of: an identifier for the analytic obtained by the model; the model itself, e.g., parameters, coefficients, etc; an indication of the type of machine-learning algorithm used to develop the model; and metadata of the model (e.g., a list of input parameters, layers and neurons per layer if the model is a neural network, etc). Those skilled in the art will appreciate that in alternative embodiments the model itself may be communicated to the data analytics entity in a different way, e.g., by providing a network address from which the model can be obtained.

The second data analytics entity applies the model to its own dataset (e.g., either the whole dataset or a subset thereof) and measures the accuracy of the model. For example, where the model is a classifier, the model can be applied to data for which the classification is known. In step 406 (which may correspond to step 816, for example), the second data analytics entity receives a report message comprising an indication of the accuracy of the model from the first data analytics entity. The report message may comprise an indication of the identity of the model or some other identifier for the current invocation of the accuracy measurement service, and an indication of the accuracy of the model when applied to the dataset of the first data analytics entity.

In step 408, the second data analytics updates the accuracy of its model through communication with the network function repository function (NRF). Thus the second data analytics entity may transmit an update message to the NRF, comprising an indication of one or more of: an identifier for the second data analytics entity; an identifier for the analytic determined by the model; and the new accuracy value.

Where multiple datasets meeting the filter criteria are identified in step 400, the method described with respect to steps 402 to 408 may be repeated for multiple or all of the identified datasets. In this way, the accuracy of the model is tested against multiple or all datasets and can be determined as accurately as possible.

Figure 5:
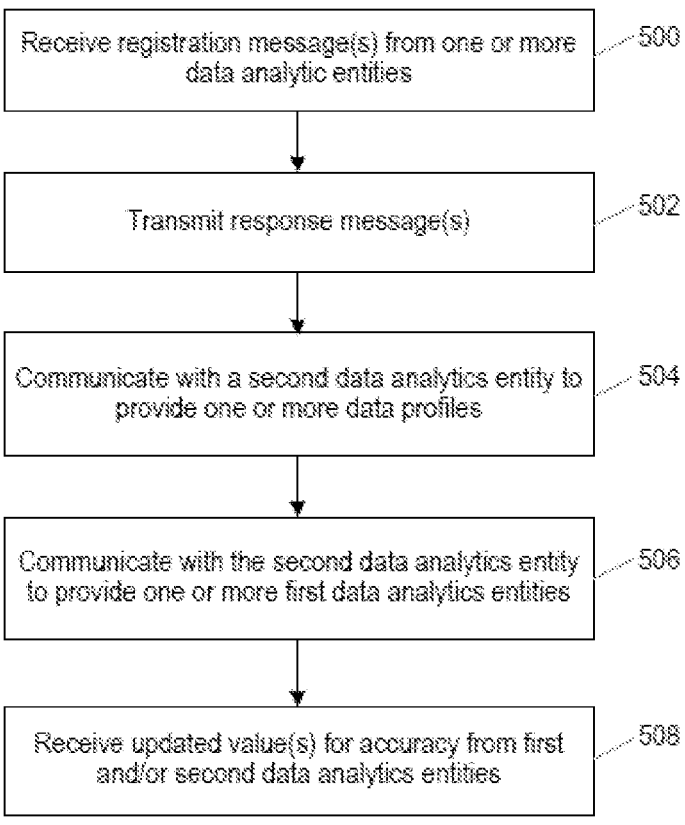
FIG. 5 is a flowchart of a method performed by a network function repository entity according to embodiments of the disclosure.

FIG. 5 is a flowchart of a method according to further embodiments of the disclosure. The method may be performed by a network function repository entity for a communications entity (such as a network function or a network node). In one embodiment, the network function repository entity implements the functionality of a network function repository function (NRF).

A number of the steps of FIG. 5 are illustrated in the signalling diagrams of FIGS. 6 to 9. In particular, the steps of FIG. 5 may correspond in some embodiments to the signalling and actions of the NRF shown in FIGS. 6, 7, 8a/8b and 9a/9b.

The method begins in step 500, in which the network function repository entity receives one or more registration messages from one or more first data analytic entities (e.g., NWDAFs), registering the services provided by those first data analytics entities. The signalling in this step is shown in greater detail in FIG. 6, and described above with respect to step 300.

As noted above, the registration messages may comprise an indication of, or a profile of, the dataset which is available to the data analytics entity, and on which the models developed by the data analytics entity are trained. The indication of the dataset may comprise one or more of: an identifier for the dataset; the number of samples in the dataset; and information on the parameters of the dataset. The information on the parameters of the dataset may comprise an indication of which parameters are included in the dataset (e.g., one or more identifiers for the parameters) as well as statistical information for the parameters, e.g., average values (mean, median, etc), maximum and/or minimum values, percentiles, variance, proportion of null or void values, etc. The indication of the dataset may further comprise time information for the dataset, e.g., an indication of the time window in which the data was collected, an average time for the data, variance of the time, whether or not the data samples include timestamps, etc.

The registration message may further comprise an indication of the analytics which the first data analytics entity is capable of providing. For each analytic, the indication may comprise one or more of: an identifier for the analytic; the type of machine-learning algorithm used to train the model providing the analytic; and an accuracy of the model providing the analytic.

According to embodiments of the disclosure, the registration message further comprises an indication of whether or not the first data analytics entity supports an accuracy measurement service. According to this service, a data analytics entity (e.g., a first data analytics entity) can receive requests from other data analytics entities (e.g., second data analytics entities) to test the accuracy of a model generated by the second data analytics entities against the dataset available to the first data analytics entity. This aspect is described in further detail below. For the purposes of description of the embodiments of the disclosure, it is assumed that the data analytics entity does support the accuracy measurement service.

In step 502, the network function repository entity acknowledges the registration of the services provided by the first data analytics entities by transmitting acknowledgement messages to the first data analytics entities.

In step 504, the network function repository entity communicates with a second data analytics entity to provide the profiles of one or more datasets meeting one or more criteria with which to determine the accuracy of the model. This step may correspond to step 402 described above.

In one embodiment, the communication with the second data analytic entity is by way of invoking a service in the network function repository entity, i.e., by receiving a request message from the second data analytic entity comprising an indication of one or more filter criteria, and sending a response message to the second data analytic entity comprising an indication of the datasets which meet the criteria. This embodiment is shown below in steps 800 and 802, and in steps 900 and 902. Alternatively, the communication with the second data analytic entity may be by way of subscription to receive notifications of events from the network function repository entity. This subscription-based embodiment is shown in steps 804, 806 and 808, and in steps 904, 906 and 908. According to this embodiment, the network function repository entity receives a request message from the second data analytics entity comprising an indication of the filter criteria as above. In this case, however, the request message is for subscription to receive notifications when a data profile meeting the filter criteria is registered with the network function repository entity. The network function repository entity then continuously checks for datasets meeting the criteria and notifies the second data analytics entity once that occurs.

In either case, the network function repository entity provides one or more messages to the second data analytics entity comprising an indication of one or more data profiles meeting the criteria. The messages may comprise the same data as indicated in the registration message described above with respect to step 300, i.e., one or more of: an identifier for the dataset; the number of samples in the dataset; and information on the parameters of the dataset.

From these data profiles, the second data analytics entity selects a dataset with which to test the accuracy of its model and, in step 506 (which may correspond to steps 810 and 812, or 910 and 912), the network function repository entity communicates with the second data analytic entity to provide the identities of one or more first data analytic entities having access to the selected dataset. The network function repository entity may receive a discovery request message from the second data analytic entity comprising an indication of one or more of: the network function type to be discovered (e.g., NWDAF); an identifier for the analytic determined by the model; an identifier for the selected dataset; an indication that the target first data analytic entity supports the accuracy measurement service; and, optionally, an indication of the machine-learning algorithm used to develop the model. The network function repository entity applies these criteria to those data analytic entities which are registered with it (e.g., in step 500) and responds with a discovery response message comprising an indication of one or more first data analytic entities which are registered with it and which meet the criteria in the discovery request message. For example, the discovery response message may comprise network addresses for each of the first data analytic entities. If the machine-learning algorithm type was not included in the discovery request message, the discovery response message may additionally include an indication of the machine-learning algorithm supported by the first data analytic entities.

The second data analytic entity may then communicate with one of the first data analytics entities to test the accuracy of its model. If the accuracy of the model is changed, then in step 508, the network function repository entity receives an update message from the second data analytics updating the accuracy of its model. For example, the network function repository entity may receive an update message from the second data analytics entity, comprising an indication of one or more of: an identifier for the second data analytics entity; an identifier for the analytic determined by the model; and the new accuracy value.

As noted above, the first data analytic entity may decide to replace its own model with the tested model if the accuracy of the model is an improvement on its own model (see step 310 described above). In this case, the network function repository entity may alternatively or additionally receive an update message from the first data analytics entity comprising an indication of one or more of: an identifier for the first data analytics entity; an identifier for the analytic determined by the model; and the new accuracy value.

The methods described above with respect to FIGS. 3, 4 and 5 thus provide a structured way for the accuracy of models to be tested on different datasets. The signalling used in these methods is shown in more detail in FIGS. 6 to 10.

Figure 6:
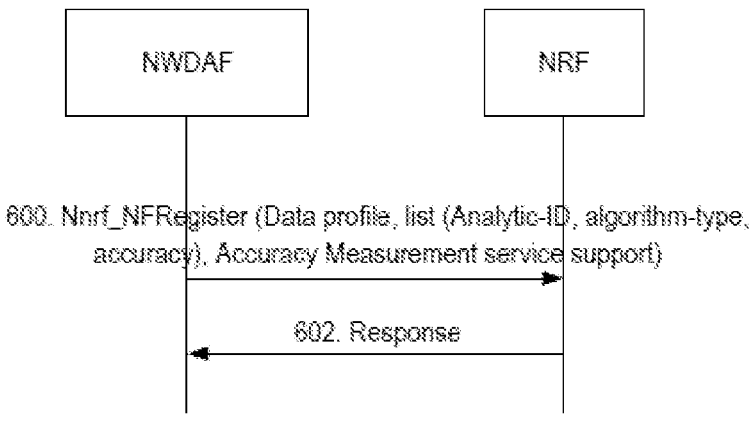
FIGS. 6 to 10 are signaling diagrams showing signaling according to embodiments of the disclosure.

FIG. 6 shows the signalling by which a data analytics entity registers its dataset profile and/or the services that it supports (e.g., the accuracy measurement service). This signalling is described in detail above, with respect to steps 300 and 302.

Figure 7:
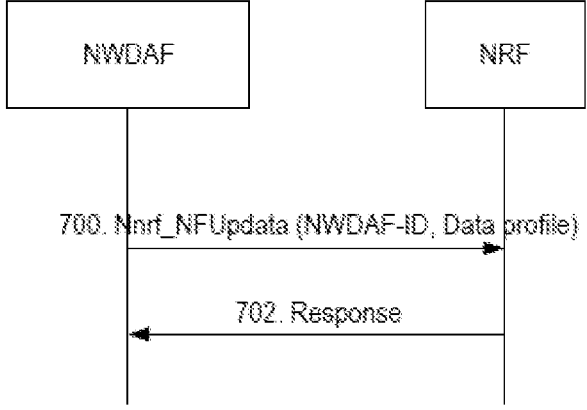

The registration of the dataset profile may be updated as the dataset changes. For example, the dataset may increase in size as more data samples are obtained, or the statistical information for data parameters may change over time. FIG. 7 shows the steps by which a data analytics entity may update the data profile registered with the NRF. In step 700, the data analytics entity transmits an update message to the NRF comprising an indication of an identifier for the data analytics entity, and the updated data profile. The updated data profile may comprise the same information as that transmitted in steps 300 and 600, described above. Alternatively, the updated data profile may comprise an indication of new values for only those parameters which have changed. In step 702, the NRF acknowledges the updated data profile.

Figure 8A:
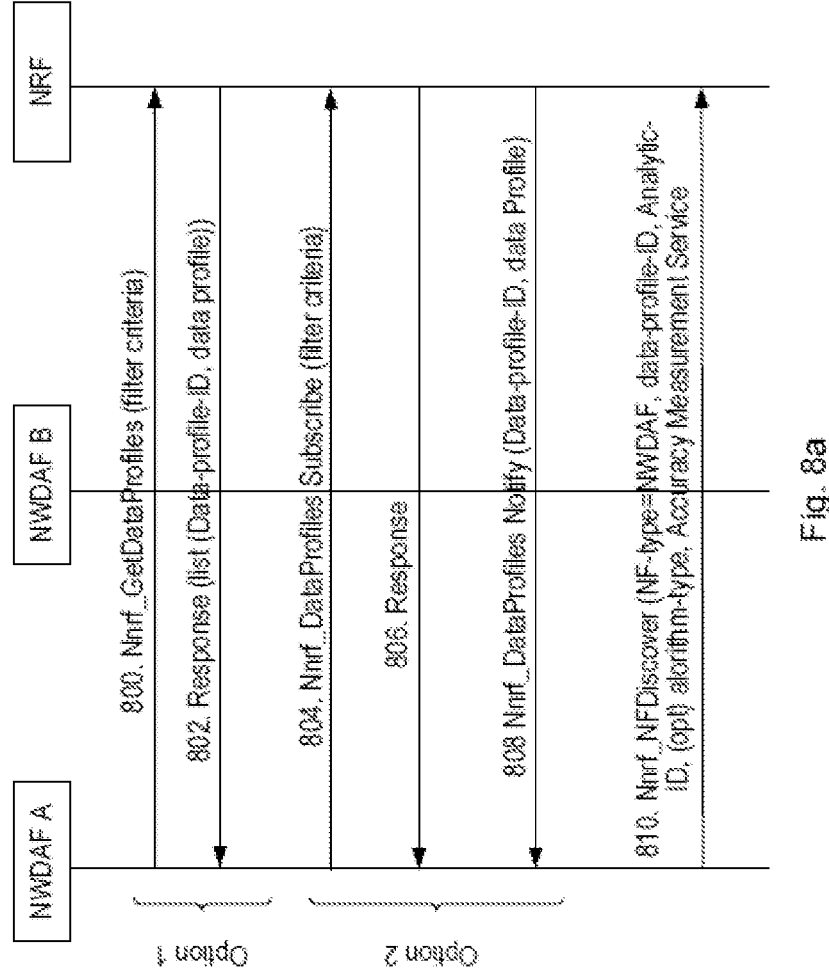
Figure 8B:
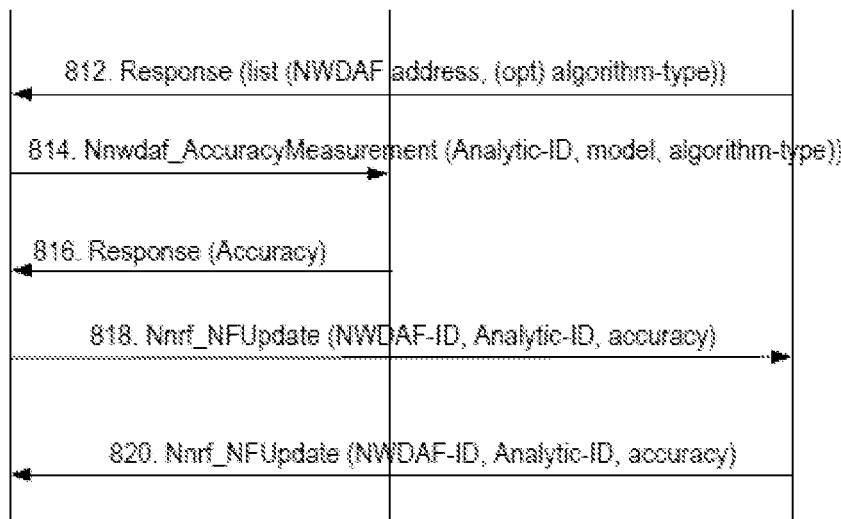
Figure 9A:
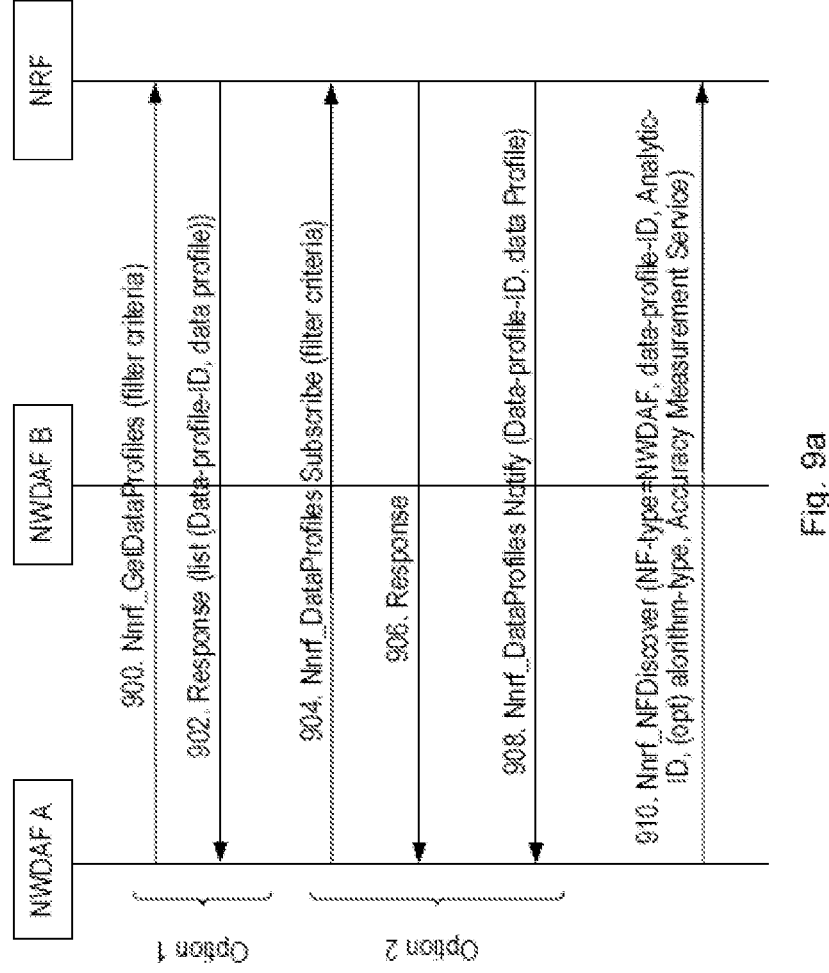
Figure 9B:
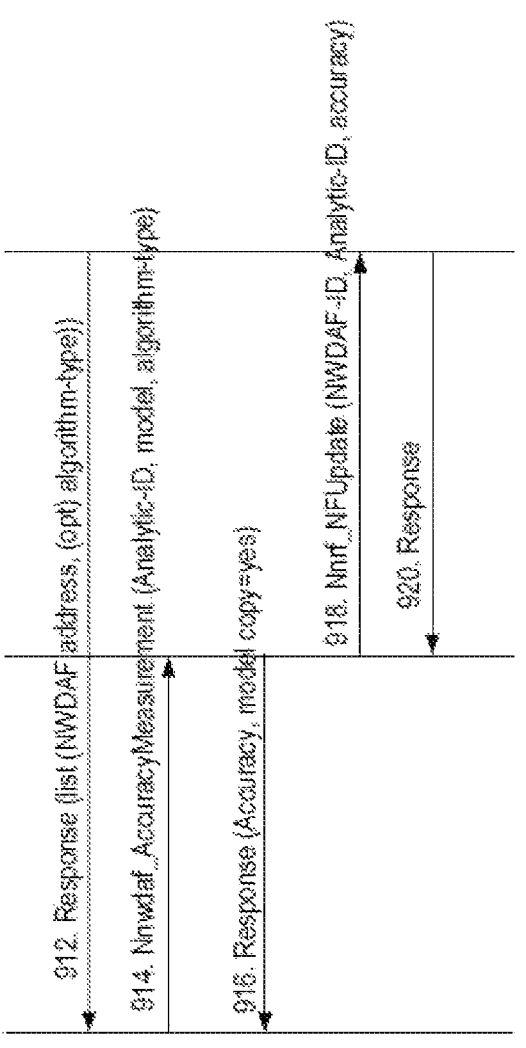

FIGS. 8a and 8b, and 9a and 9b show methods by which a second data analytics entity (e.g., NWDAF A) can test the accuracy of a model by communicating with a network function repository entity (NRF) and a first data analytics entity (e.g., NWDAF B) providing an accuracy measurement service. The signalling in these methods is described in detail above with respect to FIGS. 3, 4 and 5. FIGS. 8a and 8b show a method in which the second data analytics entity receives an indication of the accuracy of its model from the first data analytics entity (see step 816) and updates the accuracy value for its model by communicating with the network function repository entity (see step 818, receiving an acknowledgement message in step 820). FIGS. 9a and 9b show a method in which the first data analytics entity decides to replace its own model with the model developed by the second data analytics model (see also step 310 described above). In this embodiment, the first data analytics entity indicates to the second data analytics entity that the model has been copied in the report message comprising an indication of the model accuracy (see step 916). In step 918, the first data analytics entity updates the accuracy value for its model (the copy of the tested model) by communicating with the network function repository entity, receiving an acknowledgement message in step 920.

Figure 10:
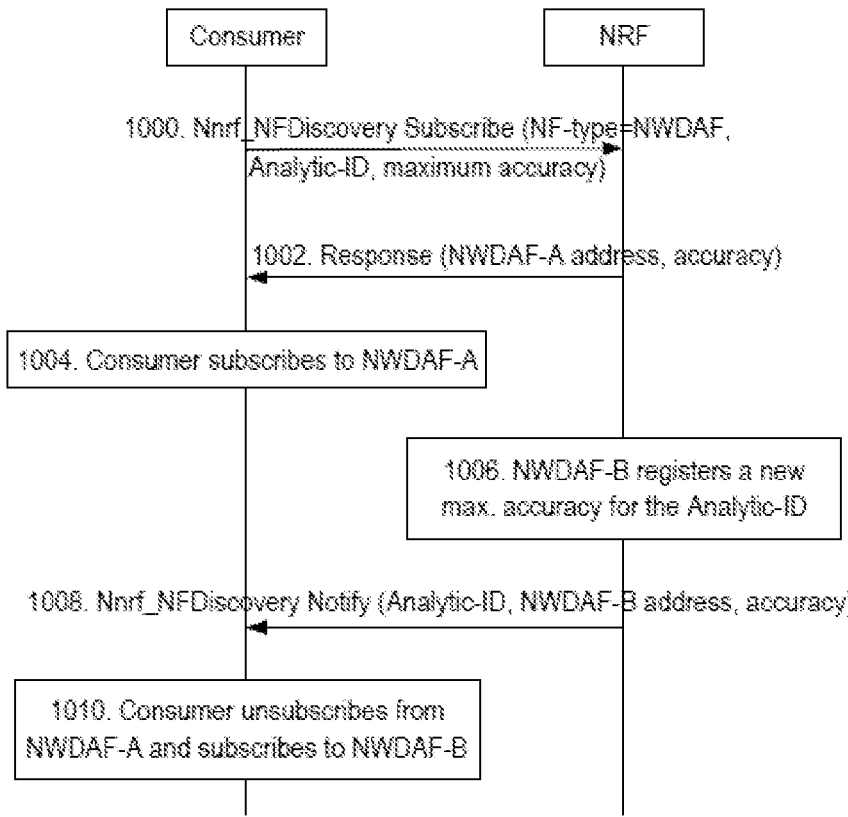

FIG. 10 is a signalling diagram showing a method by which a consumer can obtain an analytic having the best accuracy. The diagram shows signalling between a consumer (e.g., a network function seeking to utilize the services of a data analytics entity) and a network function repository entity (e.g., a NRF), and particular shows a model by which the consumer subscribes to receive notifications from the network function repository entity.

In step 1000, the consumer subscribes to the network function repository entity for notifications regarding the data analytics entity (e.g., NWDAF) providing the highest accuracy for a certain analytic. The consumer invokes a Nnrf_NFDiscovery Subscribe service operation in the network function repository entity by transmitting a subscription request message comprising an indication of: the network function type (i.e., NWDAF); an identifier for the analytic; and an indication that the consumer wants to be notified of the data analytics entity providing the maximum accuracy.

In step 1002, the network function repository entity responds with the network address of the data analytics entity providing the maximum accuracy for the identified analytic. In this case that data analytic entity is NWDAF A. The response may also comprise an indication of the accuracy value provided by the data analytics entity for that analytic.

In step 1004 the consumer subscribes to NWDAF A, e.g., through transmitting a subscription request message to NWDAF A comprising an indication of the analytic that NWDAF A is requested to provide.

At a later time, in step 1006, a second data analytics entity (NWDAF B) registers, with the network function repository entity, an accuracy value for the analytic which is higher than the accuracy value of the model employed by NWDAF A. In step 1008, responsive to registration of the model having higher accuracy, and further to the subscription by the consumer in step 1000, the network function repository entity transmits a notification message to the consumer. The notification message comprises an indication that NWDAF B has registered a higher accuracy value, and may comprise one or more of: an identifier for the analytic; a network address for NWDAF B; and an indication of the accuracy value provided by NWDAF B.

In step 1010, the consumer unsubscribes from NWDAF A and subscribes to NWDAF B for the analytic.

It will be apparent to those skilled in the art that the methods set out above can be used to test the accuracy of models providing a wide range of analytics on a wide range of datasets. The present disclosure is not limited to any particular analytic or dataset, but rather provides the technical framework by which the accuracy of models can be tested in a communications network. One example use case that can be considered, however, is heuristic-based traffic classification, which makes use of ML models to classify network traffic into applications. Usually, the traffic data that is used for model training is collected and stored locally (e.g. one data set in Spain and another in Sweden). Let's assume the traffic in Sweden is encrypted and the traffic in Spain is not, then the data sets are different, and the models trained in Spain and Sweden would also be different and when used with the same input data would produce different results. Due to having access to unencrypted traffic, the models trained in Spain are able to differentiate between different applications provided by the same service provider, whereas the models in Sweden (due to encryption) are able only to differentiate the service provider's IP addresses without having insights into the specific applications. In this case, a data analytics entity in Spain (using Spain's models) can check the accuracy of its models in a data analytics entity in Sweden (using Sweden's models), verifying that the accuracy is better than the Sweden's models. Further, the data analytics entity in Spain can update its accuracy value in the network function repository entity, allowing consumers of the data analytics entity in Sweden to use the data analytics entity in Spain instead, and therefore to get a better accuracy.

Figure 11:
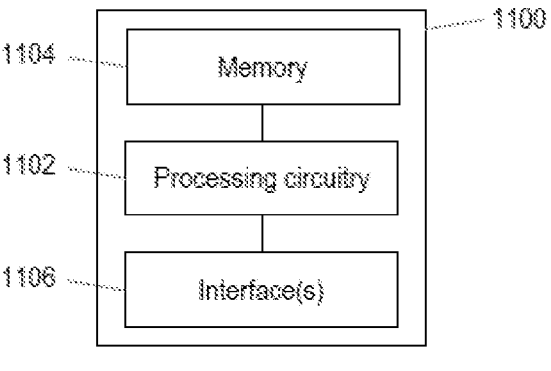
FIGS. 11 and 12 are schematic drawings of a first data analytics entity according to embodiments of the disclosure.

FIG. 11 is a schematic diagram of a network entity 1100 according to embodiments of the disclosure. The network entity may perform the method described above with respect to FIG. 3, and/or the signalling of the NWDAF described above with respect to FIGS. 6 and 7, and/or the signalling of NWDAF B described above with respect to FIGS. 8*a/b* and 9*a/b* for example. In one embodiment, the network entity 1100 implements some or all of the functionality of a NWDAF.

The entity 1100 comprises processing circuitry 1102 (such as one or more processors, digital signal processors, general purpose processing units, etc), a computer-readable medium (e.g., memory such as read-only memory (ROM), random-access memory, cache memory, flash memory devices, optical storage devices, etc) 1104 and one or more interfaces 1106. The components are illustrated coupled together in series; however, those skilled in the art will appreciate that the components may be coupled together in any suitable manner (e.g., via a system bus or suchlike).

The entity 1100 has access to a first dataset of network data. According to embodiments of the disclosure, the computer-readable medium 1104 stores instructions which, when executed by the processing circuitry 1102, cause the entity 1100 to: receive a request message from a second data analytics entity for the communications network, the request message comprising a model generated by the second data analytics entity using a machine-learning algorithm based on a second dataset to which the second data analytics entity has access, and an indication of an analytic to be calculated by the model; apply the model to the first dataset to measure the accuracy of the model; and transmit a response message to the second data analytics entity comprising an indication of the accuracy of the model when applied to the first dataset.

In further embodiments of the disclosure, the entity 1100 may comprise power circuitry (not illustrated). The power circuitry may comprise, or be coupled to, power management circuitry and is configured to supply the components of entity 1100 with power for performing the functionality described herein. Power circuitry may receive power from a power source. The power source and/or power circuitry may be configured to provide power to the various components of entity 1100 in a form suitable for the respective components (e.g., at a voltage and current level needed for each respective component). The power source may either be included in, or external to, the power circuitry and/or the entity 1100. For example, the entity 1100 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 12:
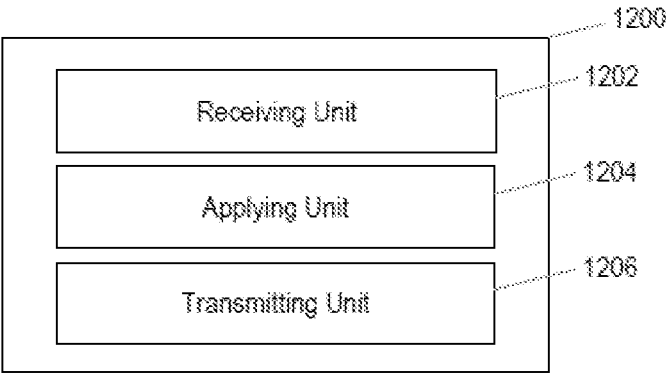

FIG. 12 is a schematic diagram of a network entity 1200 according to further embodiments of the disclosure. The network entity 1200 may perform the method described above with respect to FIG. 3, and/or the signalling of the NWDAF described above with respect to FIGS. 6 and 7, and/or the signalling of NWDAF B described above with respect to FIGS. 8*a/b* and 9*a/b* for example. In one embodiment, the network entity 1200 implements some or all of the functionality of a NWDAF.

The entity 1200 has access to a first dataset of network data. The entity 1200 comprises a receiving unit 1202, an applying unit 1204 and a transmitting unit 1206. The receiving unit 1202 is configured to receive a request message from a second data analytics entity for the communications network. The request message comprises a model generated by the second data analytics entity using a machine-learning algorithm based on a second dataset to which the second data analytics entity has access, and an indication of an analytic to be calculated by the model. The applying unit 1204 is configured to apply the model to the first dataset to measure the accuracy of the model. The transmitting unit 1206 is configured to transmit a response message to the second data analytics entity comprising an indication of the accuracy of the model when applied to the first dataset.

Figure 13:
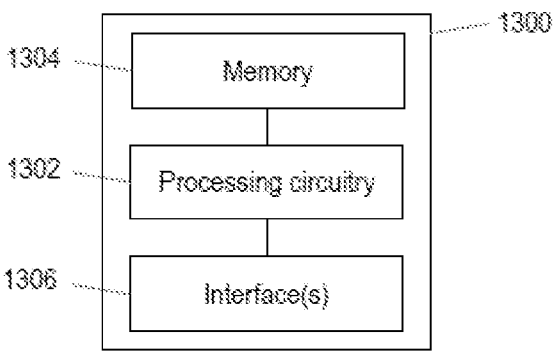
FIGS. 13 and 14 are schematic drawings of a second data analytics entity according to embodiments of the disclosure.

FIG. 13 is a schematic diagram of a network entity 1300 according to embodiments of the disclosure. The network entity may perform the method described above with respect to FIG. 4, and/or the signalling of NWDAF A described above with respect to FIGS. 8*a/b* and 9*a/b* for example. In one embodiment, the network entity 1300 implements some or all of the functionality of a NWDAF.

The entity 1300 comprises processing circuitry 1302 (such as one or more processors, digital signal processors, general purpose processing units, etc), a computer-readable medium (e.g., memory such as read-only memory (ROM), random-access memory, cache memory, flash memory devices, optical storage devices, etc) 1304 and one or more interfaces 1306. The components are illustrated coupled together in series; however, those skilled in the art will appreciate that the components may be coupled together in any suitable manner (e.g., via a system bus or suchlike).

The entity 1300 has access to a second dataset of network data. According to embodiments of the disclosure, the computer-readable medium 1304 stores instructions which, when executed by the processing circuitry 1302, cause the entity 1300 to: transmit a request message to a first data analytics entity for the communications network, the request message comprising a model generated by the second data analytics entity using a machine-learning algorithm based on the second dataset, and an indication of an analytic to be calculated by the model, the first data analytics entity having access to a first dataset of network data; and receive a response message from the first data analytics entity comprising an indication of the accuracy of the model when applied to the first dataset to calculate one or more values for the analytic.

In further embodiments of the disclosure, the entity 1300 may comprise power circuitry (not illustrated). The power circuitry may comprise, or be coupled to, power management circuitry and is configured to supply the components of entity 1300 with power for performing the functionality described herein. Power circuitry may receive power from a power source. The power source and/or power circuitry may be configured to provide power to the various components of entity 1300 in a form suitable for the respective components (e.g., at a voltage and current level needed for each respective component). The power source may either be included in, or external to, the power circuitry and/or the entity 1300. For example, the entity 1300 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 14:
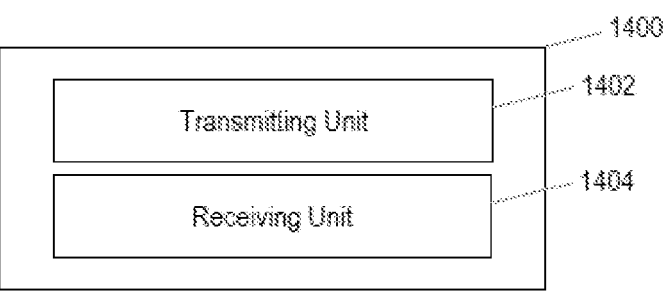

FIG. 14 is a schematic diagram of a network entity 1400 according to further embodiments of the disclosure. The network entity 1400 may perform the method described above with respect to FIG. 4, and/or the signalling of NWDAF A described above with respect to FIGS. 8*a/b* and 9*a/b* for example. In one embodiment, the network entity 1400 implements some or all of the functionality of a NWDAF.

The entity 1400 has access to a second dataset comprising network data. The entity 1400 comprises a transmitting unit 1402 and a receiving unit 1404. The transmitting unit 1402 is configured to transmit a request message to a first data analytics entity for the communications network, the request message comprising a model generated by the second data analytics entity using a machine-learning algorithm based on the second dataset, and an indication of an analytic to be calculated by the model, the first data analytics entity having access to a first dataset of network data. The receiving unit 1404 is configured to receive a response message from the first data analytics entity comprising an indication of the accuracy of the model when applied to the first dataset to calculate one or more values for the analytic.

Figure 15:
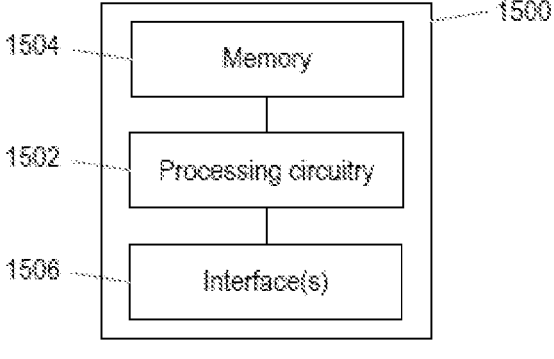
FIGS. 15 and 16 are schematic drawings of a network function repository entity according to embodiments of the disclosure.

FIG. 15 is a schematic diagram of a network function repository entity 1500 according to embodiments of the disclosure. The network function repository entity may perform the method described above with respect to FIG. 5, and/or the signalling of the NRF described above with respect to FIGS. 6, 7, 8*a/b* and 9*a/b* for example. In one embodiment, the network function repository entity 1500 implements some or all of the functionality of a NRF.

The entity 1500 comprises processing circuitry 1502 (such as one or more processors, digital signal processors, general purpose processing units, etc), a computer-readable medium (e.g., memory such as read-only memory (ROM), random-access memory, cache memory, flash memory devices, optical storage devices, etc) 1504 and one or more interfaces 1506. The components are illustrated coupled together in series; however, those skilled in the art will appreciate that the components may be coupled together in any suitable manner (e.g., via a system bus or suchlike).

According to embodiments of the disclosure, the computer-readable medium 1504 stores instructions which, when executed by the processing circuitry 1502, cause the entity 1500 to: receive a registration request message from a first data analytics entity, the first data analytics entity having access to a first dataset of network data. The registration request message comprises: a data profile for the first dataset; an indication of analytics which the first data analytics entity is capable of calculating; and an indication that the first data analytics entity is capable of responding to request messages from other data analytics entities.

In further embodiments of the disclosure, the entity 1500 may comprise power circuitry (not illustrated). The power circuitry may comprise, or be coupled to, power management circuitry and is configured to supply the components of entity 1500 with power for performing the functionality described herein. Power circuitry may receive power from a power source. The power source and/or power circuitry may be configured to provide power to the various components of entity 1500 in a form suitable for the respective components (e.g., at a voltage and current level needed for each respective component). The power source may either be included in, or external to, the power circuitry and/or the entity 1500. For example, the entity 1500 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 16:
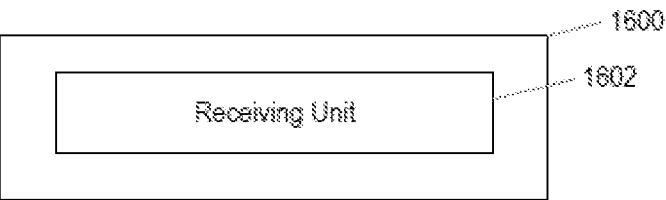

FIG. 16 is a schematic diagram of a network function repository entity 1600 according to further embodiments of the disclosure. The network entity 1600 may perform the method described above with respect to FIG. 5, and/or the signalling of the NRF described above with respect to FIGS. 6, 7, 8*a/b* and 9*a/b* for example. In one embodiment, the network function repository entity 1600 implements some or all of the functionality of a NRF.

The network function repository entity 1600 comprises a receiving unit 1602. The receiving unit 1602 is configured to receive a registration request message from a first data analytics entity, the first data analytics entity having access to a first dataset of network data. The registration request message comprises: a data profile for the first dataset; an indication of analytics which the first data analytics entity is capable of calculating; and an indication that the first data analytics entity is capable of responding to request messages from other data analytics entities.

The term "unit" may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The disclosure thus provides methods for standardizing and improving the accuracy of machine-learning models in a communication network, by allowing data analytic network entities to check the accuracy of models on different datasets, and potentially updating models to those with greater accuracy.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The invention claimed is:

1. A method performed by a first data analytics entity for a communications network, the first data analytics entity having access to a first dataset of network data, the method comprising:

receiving a request message from a second data analytics entity for the communications network, the request message comprising a model generated by the second data analytics entity using a machine-learning algorithm based on a second dataset to which the second data analytics entity has access, and an indication of an analytic to be calculated by the model;

applying the model to the first dataset to measure an accuracy of the model; and transmitting a response message to the second data analytics entity comprising an indication of the accuracy of the model when applied to the first dataset.

2. The method according to claim 1, wherein the request message further comprises an indication of the machine-learning algorithm used by the second data analytics entity.

3. The method according to claim 1, further comprising transmitting a registration request message to a network function repository entity, the registration request message comprising one or more of: a data profile for the first dataset; an indication of analytics which the first data analytics entity is capable of calculating; and an indication that the first data analytics entity is capable of responding to request messages from other data analytics entities.

4. The method according to claim 3, wherein the data profile for the first dataset comprises one or more of: an identifier of the first dataset; a number of data samples in the first dataset; and information relating to parameters of the first dataset.

5. The method according to claim 1, further comprising, responsive to a determination that the accuracy of the model when applied to the first dataset is greater than an accuracy of a local model utilized by the first data analytics entity to calculate the analytic, replacing the local model with the model contained in the request message.

6. The method according to claim 1, further comprising, responsive to a determination that the accuracy of the model when applied to the first dataset is greater than an accuracy of a local model utilized by the first data analytics entity to calculate the analytic, combining the local model with the model contained in the request message to generate a new local model.

7. The method according to claim 1, wherein at least one of the first data analytics entity and the second data analytics entity implements functionality of one or more of: a Network Data Analytics Function, NWDAF; and a Management and Organization Data Analytics Function, MDAF.

8. A method performed by a second data analytics entity for a communications network, the second data analytics entity having access to a second dataset of network data, the method comprising:

transmitting a request message to a first data analytics entity for the communications network, the request message comprising a model generated by the second data analytics entity using a machine-learning algorithm based on the second dataset, and an indication of an analytic to be calculated by the model, the first data analytics entity having access to a first dataset of the network data; and receiving a response message from the first data analytics entity comprising an indication of an accuracy of the model when applied to the first dataset to calculate one or more values for the analytic.

9. The method according to claim 8, wherein the request message further comprises an indication of the machine-learning algorithm used by the second data analytics entity.

10. A first data analytics entity for a communications network, the first data analytics entity having access to a first dataset of network data and comprising processing circuitry and a non-transitory machine-readable medium storing instructions which, when executed by the processing circuitry, cause the first data analytics entity to:

receive a request message from a second data analytics entity for the communications network, the request message comprising a model generated by the second data analytics entity using a machine-learning algorithm based on a second dataset to which the second data analytics entity has access, and an indication of an analytic to be calculated by the model;

apply the model to the first dataset to measure an accuracy of the model; and transmit a response message to the second data analytics entity comprising an indication of the accuracy of the model when applied to the first dataset.

11. The first data analytics entity according to claim 10, wherein the first data analytics entity is further caused to transmit a registration request message to a network function repository entity, the registration request message comprising one or more of: a data profile for the first dataset; an indication of analytics which the first data analytics entity is capable of calculating; and an indication that the first data analytics entity is capable of responding to request messages from other data analytics entities.

12. The first data analytics entity according to claim 11, wherein the data profile for the first dataset comprises one or more of: an identifier of the first dataset; a number of data samples in the first dataset; and information relating to parameters of the first dataset.

13. The first data analytics entity according to claim 10, wherein the first data analytics entity is further caused to, responsive to a determination that the accuracy of the model when applied to the first dataset is greater than an accuracy of a local model utilized by the first data analytics entity to calculate the analytic, replace the local model with the model contained in the request message or combine the local model with the model contained in the request message to generate a new local model.

14. A second data analytics entity for a communications network, the second data analytics entity having access to a second dataset of network data and comprising processing circuitry and a non-transitory machine-readable medium storing instructions which, when executed by the processing circuitry, cause the second data analytics entity to:

transmit a request message to a first data analytics entity for the communications network, the request message comprising a model generated by the second data analytics entity using a machine-learning algorithm based on the second dataset, and an indication of an analytic to be calculated by the model, the first data analytics entity having access to a first dataset of the network data; and receive a response message from the first data analytics entity comprising an indication of an accuracy of the model when applied to the first dataset to calculate one or more values for the analytic.

15. The second data analytics entity according to claim 14, wherein the second data analytics entity is further caused to:

transmit a dataset request message to a network function repository entity, the dataset request message comprising an indication of one or more conditions for a dataset; and receive a dataset response message from the network function repository entity, the dataset response message comprising an indication of one or more candidate datasets, including the first dataset, meeting the one or more conditions.

16. The second data analytics entity according to claim 15, wherein the dataset request message comprises a dataset subscription message, subscribing to receive indications of datasets from the network function repository entity, and wherein the dataset response message comprises a dataset service message in response to the subscription.

17. The second data analytics entity according to claim 15, wherein the second data analytics entity is further caused to:

transmit a data analytic request message to the network function repository entity, the data analytic request message comprising an indication of at least one of the one or more candidate datasets; and receive a data analytic response message from the network function repository entity, the data analytic response message comprising an indication of one or more candidate data analytics entities, including the first data analytics entity, having access to the at least one of the one or more candidate datasets.

* * * * *